(12) United States Patent
Bailey, Sr.

(10) Patent No.: US 9,869,111 B1
(45) Date of Patent: Jan. 16, 2018

(54) TENT POLE WEIGHT SYSTEM

(71) Applicant: Lionel Bailey, Sr., St. Louis, MO (US)

(72) Inventor: Lionel Bailey, Sr., St. Louis, MO (US)

( * ) Notice: Subject to any disclaimer, the term of this patent is extended or adjusted under 35 U.S.C. 154(b) by 0 days.

(21) Appl. No.: 15/365,373

(22) Filed: Nov. 30, 2016

(51) Int. Cl.
*E04H 15/62* (2006.01)
*E04H 15/60* (2006.01)
*E04H 12/22* (2006.01)
*F16M 13/00* (2006.01)

(52) U.S. Cl.
CPC .............. *E04H 15/62* (2013.01); *E04H 12/22* (2013.01); *E04H 15/60* (2013.01); *F16M 13/00* (2013.01)

(58) Field of Classification Search
CPC ......... E04H 15/62; E04H 15/60; E04H 15/32; E04H 12/2246; E04H 12/2284; E04H 12/22; Y10S 248/91; F16M 13/00
USPC .................. 248/519, 523, 529, 910
See application file for complete search history.

(56) References Cited

U.S. PATENT DOCUMENTS

| | | | | |
|---|---|---|---|---|
| 3,415,475 A | * | 12/1968 | Goodman | F16M 11/22 248/158 |
| 5,020,764 A | * | 6/1991 | Yamamoto | E04H 12/2246 248/529 |
| 6,080,089 A | * | 6/2000 | Nicholson | A63B 69/208 248/519 |
| 6,539,665 B1 | * | 4/2003 | Llona | A01G 9/02 206/423 |
| 6,986,496 B2 | * | 1/2006 | Roberts | E01F 9/692 248/519 |
| 7,721,748 B2 | * | 5/2010 | Dreamwalker | E04H 15/60 135/114 |
| 7,797,880 B1 | * | 9/2010 | Kamau | A01G 9/02 47/66.1 |
| 8,424,549 B1 | * | 4/2013 | Goldsmith | E04H 15/60 135/116 |
| 8,714,174 B1 | * | 5/2014 | DeSousa | E04H 12/2246 135/117 |
| 8,851,095 B2 | * | 10/2014 | LeAnna | A45B 3/00 135/120.1 |
| 2009/0100789 A1 | * | 4/2009 | Hornbeak | E04H 12/2238 52/745.19 |
| 2012/0168597 A1 | * | 7/2012 | Hendrix | E04H 12/2238 248/523 |
| 2017/0101799 A1 | * | 4/2017 | Koerner | E04H 12/2246 |

* cited by examiner

*Primary Examiner* — Winnie Yip

(57) ABSTRACT

A tent pole weight system for erecting a tent includes a tent that has a plurality of poles. Each of the poles has a pair of ends. A plurality of weight units is provided. Each weight unit is selectively coupled an associated one of the ends of an associated one of the poles. Thus, each of the weight units retains the associated pole in a selected position.

8 Claims, 5 Drawing Sheets

TENT POLE WEIGHT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to weight devices and more particularly pertains to a new weight device for erecting a tent.

BRIEF SUMMARY OF THE INVENTION

An embodiment of the disclosure meets the needs presented above by generally comprising a tent that has a plurality of poles. Each of the poles has a pair of ends. A plurality of weight units is provided. Each weight unit is selectively coupled an associated one of the ends of an associated one of the poles. Thus, each of the weight units retains the associated pole in a selected position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
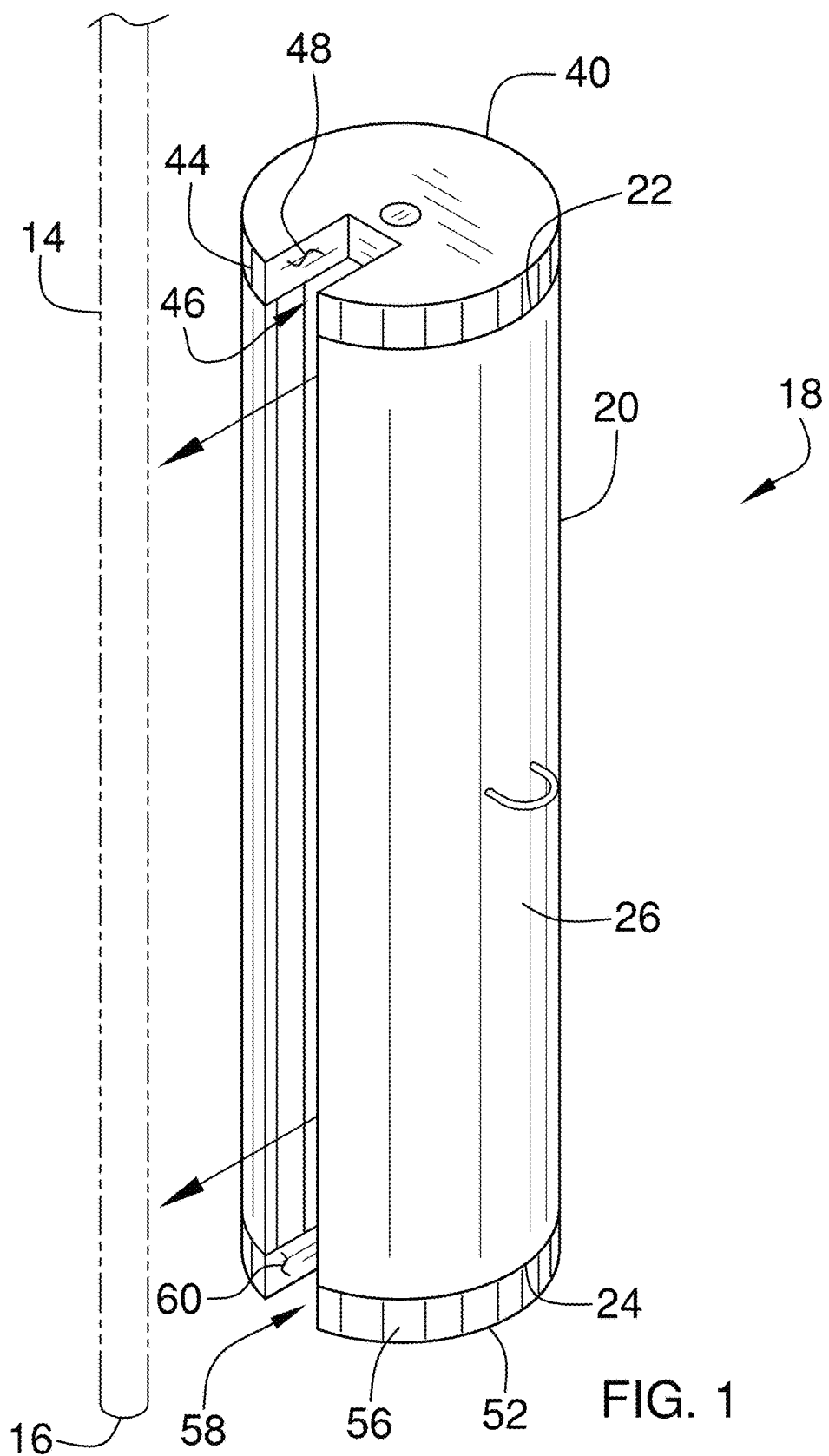
FIG. 1 is a perspective view of a tent pole weight system according to an embodiment of the disclosure.
Figure 2:
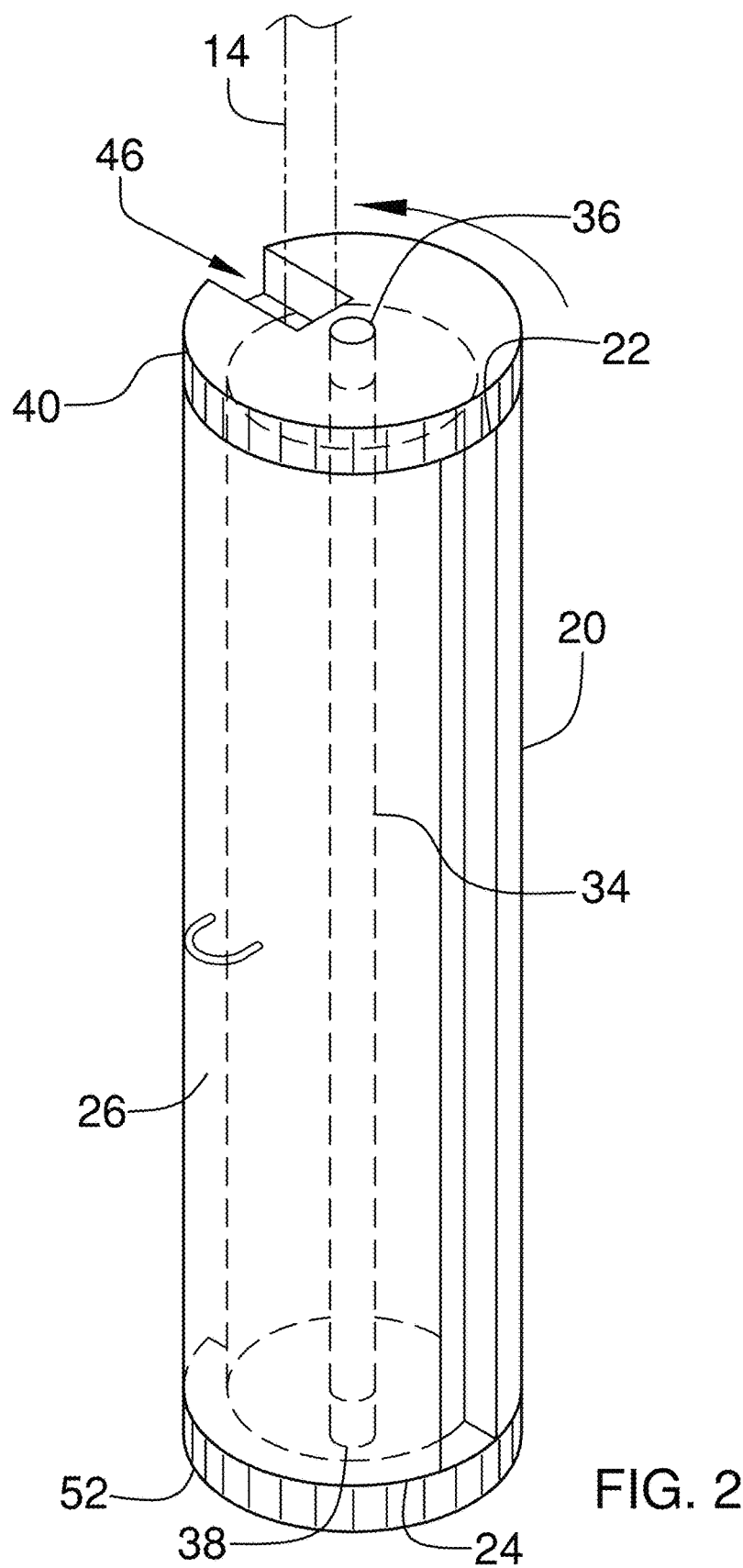
FIG. 2 is a perspective phantom view of an embodiment of the disclosure.
Figures 3, 4:
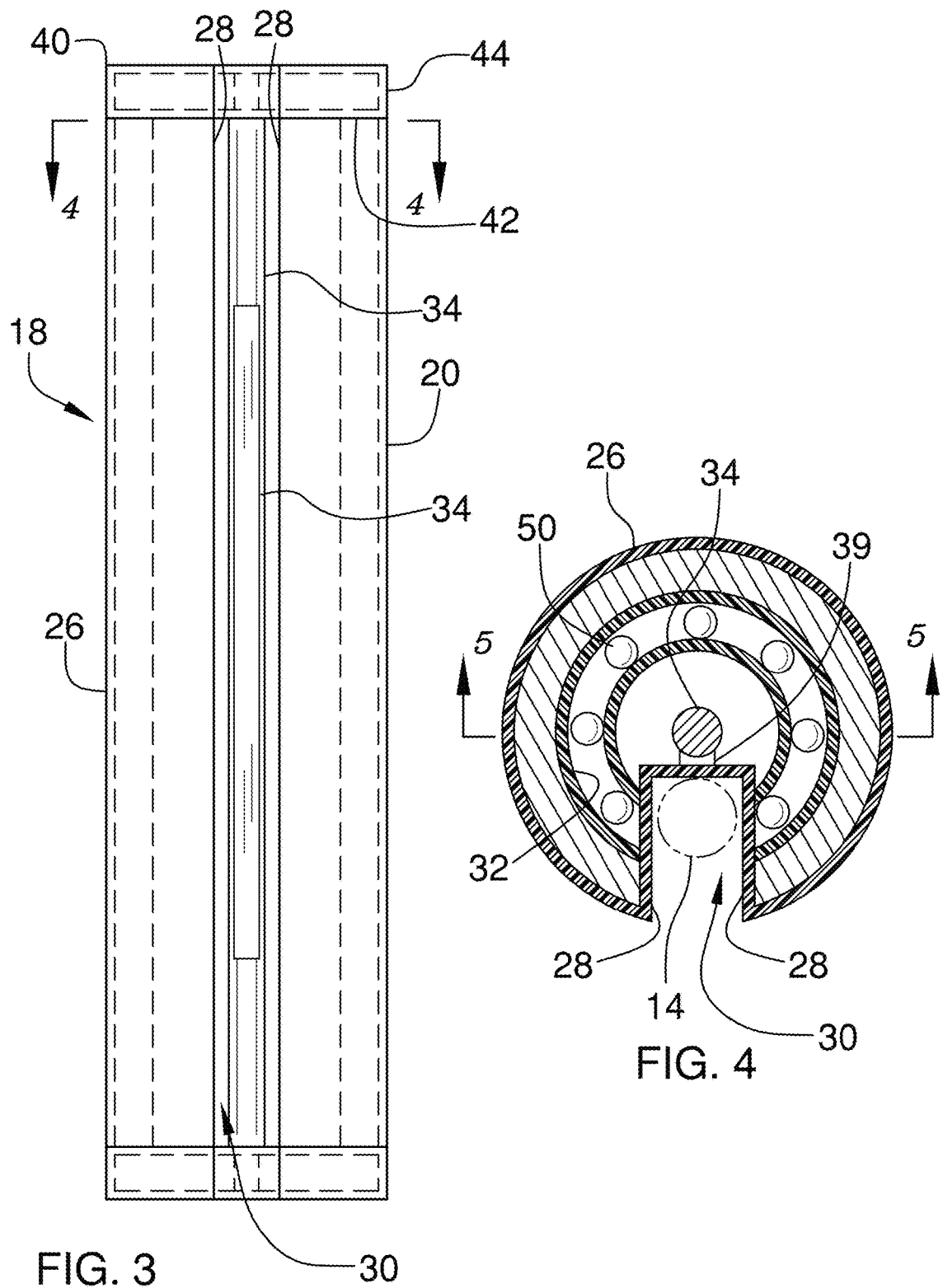
FIG. 3 is a front phantom view of an embodiment of the disclosure.
FIG. 4 is a cross sectional view taken along line 4-4 of FIG. 3 of an embodiment of the disclosure.
Figure 5:
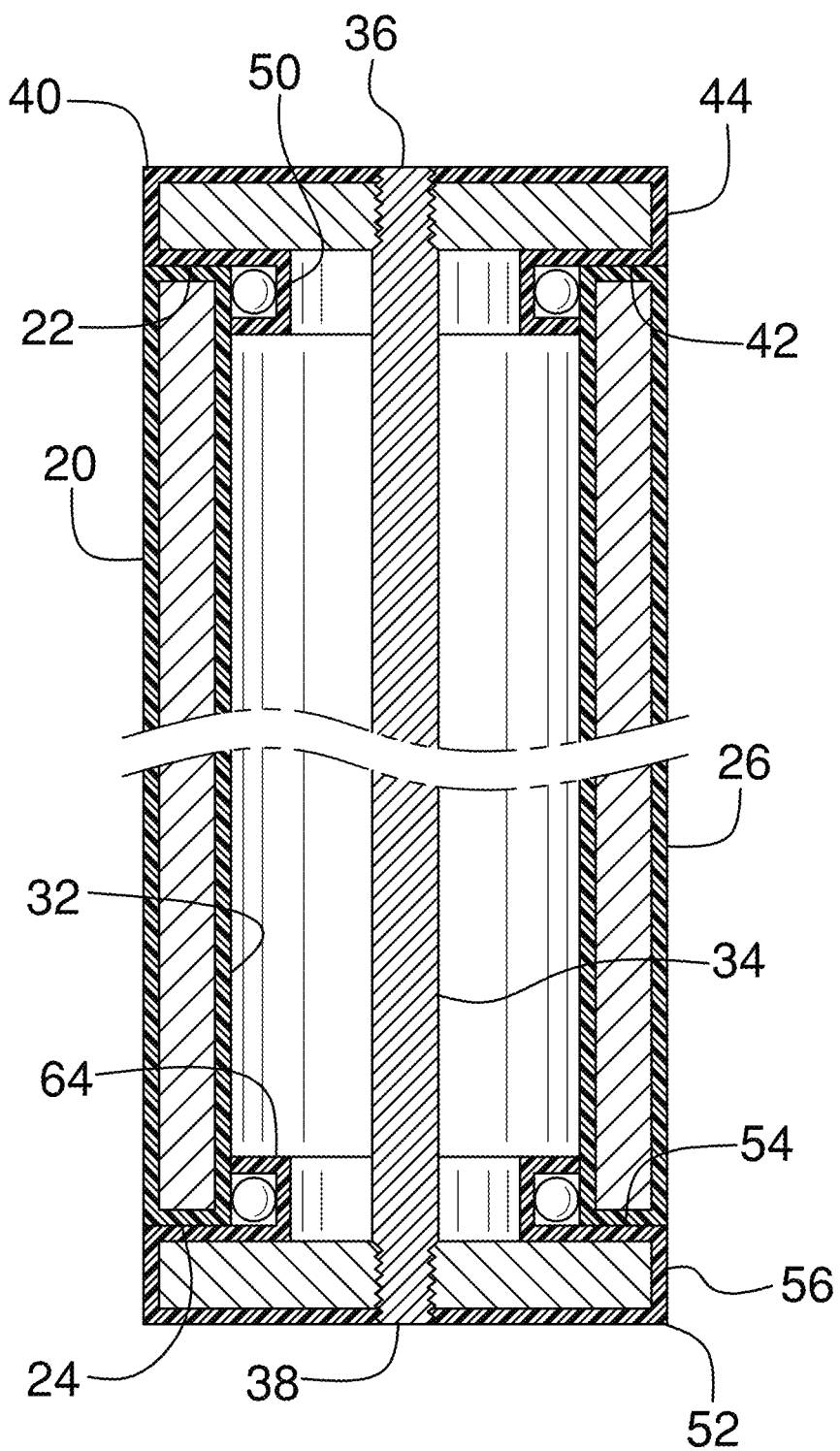
FIG. 5 is a cross sectional view taken along line 5-5 of FIG. 4 of an embodiment of the disclosure.
Figure 6:
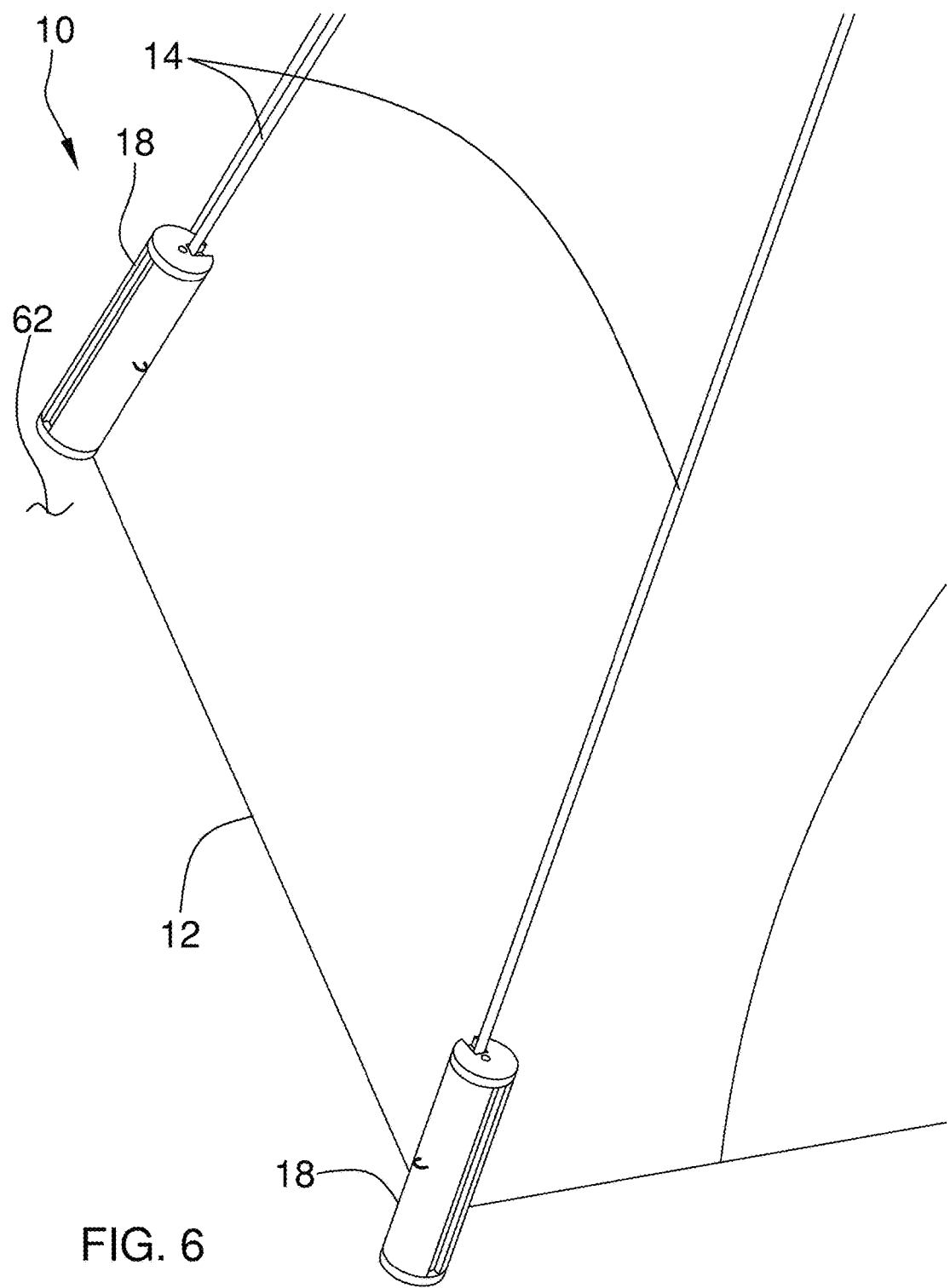
FIG. 6 is a perspective in-use view of an embodiment of the disclosure.

With reference now to the drawings, and in particular to FIGS. 1 through 6 thereof, a new weight device embodying the principles and concepts of an embodiment of the disclosure and generally designated by the reference numeral 10 will be described.

As best illustrated in FIGS. 1 through 6, the tent pole weight system 10 generally comprises a tent 12 that has a plurality of poles 14. Each of the poles 14 has a pair of ends 16. The tent 12 may be a camping tent 12 or the like. Each of the poles 14 may be tent pole 14s or the like.

A plurality of weight units 18 is provided. Each weight unit is selectively coupled to an associated one of the ends 16 of an associated one of the poles 14. Thus, each of the weight units 18 retains the associated pole 14 in a selected position. Moreover, each of the weight units 18 inhibits the tent 12 from being blown by wind.

Each of the weight units 18 comprises a cylinder 20 that has a first end 22, a second end 24 and an outer wall 26 extending therebetween. The cylinder 20 has a pair of spaced walls 28 to define a well 30 extending from the outer wall 26 toward a center of the cylinder 20. The well 30 extends 16 between the first end 22 and the second end 24. The outer wall 26 has an inner surface 32.

A rod 34 is provided. The rod 34 has a primary end 36 and a secondary end 38. The rod 34 is threaded adjacent to each of the primary end 36 and the secondary end 38. Moreover, the rod 34 is vertically oriented in the cylinder 20. A magnet 39 is coupled to the rod 34. The magnet 39 is substantially coextensive with the rod 34.

A first disk 40 is provided that has a first surface 42 and a peripheral edge 44. The peripheral edge 44 has a first slot 46 extending toward a center of the first disk 40. The first slot 46 has a bounding surface 48. The primary end 36 of the rod 34 threadably engages the first surface 42. Thus, the first disk 40 is rotatably positioned on the first end 22 of the cylinder 20.

The first disk 40 is selectively rotated between a first position and a second position. The first slot 46 is aligned with the well 30 in the cylinder 20 when the first disk 40 is in the first position. Thus, the associated pole 14 is positionable in the well 30. The associated pole 14 is compressed between the bounding surface 48 of the first slot 46 and an associated one of the spaced walls 28 in the cylinder 20 when the first disk 40 is positioned in the second position. Thus, the cylinder 20 is retained on the associated pole 14. The pole 14 is magnetically attracted to the magnet 39 when the pole is positioned in the well 30.

A first bearing 50 is provided. The first bearing 50 is coupled to the first surface 42 of the first disk 40. The rod 34 extends 16 through the first bearing 50. The first bearing 50 engages the inner surface 32 of the cylinder 20. Moreover, the first bearing 50 reduces friction between the first disk 40 and the cylinder 20. The first bearing 50 may be a ring bearing or the like.

A second disk 52 is provided. The second disk 52 has a second surface 54 and a peripheral edge 56. The peripheral edge 56 of the second disk 52 has a second slot 58 extending toward a center of the second disk 52. The second slot 58 has a bounding surface 60. The secondary end 38 of the rod 34 threadably engages the second surface 54 of the second disk 52. Thus, the second disk 52 is rotatably positioned on the second end 24 of the cylinder 20.

The second disk 52 is selectively rotated between a first position and a second position. The second slot 58 is aligned with the well 30 in the cylinder 20 when the second disk 52 is in the first position. Thus, the associated pole 14 is positionable in the well 30. The associated pole 14 is compressed between the bounding surface 60 of the second slot 58 and an associated one of the spaced walls 28 in the cylinder 20 when the second disk 52 is in the second position. Thus, the cylinder 20 is retained on the associated pole 14.

The second disk 52 may be positioned to abut a support surface 62 when the associated pole 14 is positioned in the cylinder 20. The support surface 62 may be ground. A second bearing 64 is coupled to the second surface 54 of the second disk 52. The rod 34 extends 16 through the second bearing 64. The second bearing 64 engages the inner surface 32 of the cylinder 20. Moreover, the second bearing 64 reduces friction between the second disk 52 and the cylinder 20.

In use, each of the poles 14 is positioned in the slot of an associated one of the weight units 18. The first and second disk 52 on each of the associated weight units 18 is manipulated into the second position. Thus, each of the weight units 18 is coupled to the associated poles 14. The second disk 52 corresponding to each of the weight units 18 is positioned on the support surface. Each of the weight units 18 retains the poles 14 in a selected position. Additionally, the cylindrical shape of each weight unit facilitates foot traffic around the poles 14. Each of the weight units 18 inhibits the tent 12 from being blown over by wind.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tent pole weight system comprising:
   a tent having a plurality of poles, each of said poles having a pair of ends;
   a plurality of weight units, each of said weight units being selectively coupled an associated one of said ends of an associated one of said poles wherein each of said weight units is configured to retain said associated pole in a selected position, each of said weight units comprising a cylinder having a first end, a second end and an outer wall extending therebetween, said cylinder having a pair of spaced walls to define a well extending from said outer wall toward a center of said cylinder, said well extending between said first end and said second end, said outer wall having an inner surface; and
   a rod having a primary end and a secondary end, said rod being threaded adjacent to each of said primary end and said secondary end, said rod being vertically oriented in said cylinder.

2. The system according to claim 1, further comprising a first disk having a first surface and a peripheral edge, said peripheral edge having a first slot extending toward a center of said first disk, said first slot having a bounding surface, said primary end of said rod threadably engaging said first surface such that said first disk is rotatably positioned on said first end of said cylinder.

3. The system according to claim 2, wherein said first disk is selectively rotated between a first position and a second position, said first slot being aligned with said well in said cylinder when said first disk is in said first position such that said associated pole is positionable in said well, said associated pole being compressed between said bounding surface of said first slot and an associated one of said spaced walls in said cylinder when said first disk is in said second position such that said cylinder is retained on said associated pole.

4. The system according to claim 2, further comprising a first bearing being coupled to said first surface of said first disk, said rod extending through said first bearing, said first bearing engaging said inner surface of said cylinder such that said first bearing reduces friction between said first disk and said cylinder.

5. The system according to claim 1, further comprising a second disk having a second surface and a peripheral edge, said peripheral edge of said second disk having a second slot extending toward a center of said second disk, said second slot having a bounding surface, said secondary end of said rod threadably engaging said second surface such that said second disk is rotatably positioned on said second end of said cylinder.

6. The system according to claim 5, wherein said second disk is selectively rotated between a first position and a second position, said second slot being aligned with said well in said cylinder when said second disk is in said first position such that said associated pole is positionable in said well, said associated pole being compressed between said bounding surface of said second slot and an associated one of said spaced walls in said cylinder such when said second disk is in said second position that said weight unit is retained on said associated pole, said second disk being configured to abut a support surface when said associated pole is positioned in said cylinder.

7. The system according to claim 5, further comprising a second bearing being coupled to said second surface of said second disk, said rod extending through said second bearing, said second bearing engaging said inner surface of said cylinder such that said second bearing reduces friction between said second disk and said cylinder.

8. A tent pole weight system comprising:
   a tent having a plurality of poles, each of said poles having a pair of ends; and
   a plurality of weight units, each of said weight units being selectively coupled an associated one of said ends of an associated one of said poles wherein each of said weight units is configured to retain said associated pole in a selected position, each of said weight units comprising:
      a cylinder having a first end, a second end and an outer wall extending therebetween, said cylinder having a pair of spaced walls to define a well extending from said outer wall toward a center of said cylinder, said well extending between said first end and said second end, said outer wall having an inner surface,
      a rod having a primary end and a secondary end, said rod being threaded adjacent to each of said primary end and said secondary end, said rod being vertically oriented in said cylinder,
      a first disk having a first surface and a peripheral edge, said peripheral edge having a first slot extending toward a center of said first disk, said first slot having a bounding surface, said primary end of said rod threadably engaging said first surface such that said first disk is rotatably positioned on said first end of said cylinder, said first disk being selectively rotated between a first position and a second position, said first slot being aligned with said well in said cylinder when said first disk is in said first position such that said associated pole is positionable in said well, said associated pole being compressed between said bounding surface of said first slot and an associated one of said spaced walls in said cylinder when said first disk is in said second position such that said cylinder is retained on said associated pole,
      a first bearing being coupled to said first surface of said first disk, said rod extending through said first bearing, said first bearing engaging said inner surface of said cylinder such that said first bearing reduces friction between said first disk and said cylinder,
      a second disk having a second surface and a peripheral edge, said peripheral edge of said second disk having a second slot extending toward a center of said second disk, said second slot having a bounding surface, said secondary end of said rod threadably engaging said second surface such that said second disk is rotatably positioned on said second end of said cylinder, said second disk being selectively rotated between a first position and a second position, said second slot being aligned with said well in said cylinder when said second disk is in said first position such that said associated pole is positionable in said well, said associated pole being compressed between said bounding surface of said second slot and an associated one of said spaced walls in said cylinder when said second disk is in said second position such that said weight unit is retained on said associated pole, said second disk being configured to abut a support surface when said associated pole is positioned in said cylinder, and
      a second bearing being coupled to said second surface of said second disk, said rod extending through said second bearing, said second bearing engaging said inner surface of said cylinder such that said second bearing reduces friction between said second disk and said cylinder.

* * * * *